US011281556B2

United States Patent
Morita

(10) Patent No.: US 11,281,556 B2
(45) Date of Patent: Mar. 22, 2022

(54) RESOURCE MANAGEMENT APPARATUS AND RESOURCE MANAGEMENT METHOD

(71) Applicant: FUJITSU LIMITED, Kawasaki (JP)

(72) Inventor: Mikio Morita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 436 days.

(21) Appl. No.: 16/381,049

(22) Filed: Apr. 11, 2019

(65) Prior Publication Data

US 2019/0332515 A1 Oct. 31, 2019

(30) Foreign Application Priority Data

Apr. 26, 2018 (JP) .............................. JP2018-085241

(51) Int. Cl.
*G06F 11/34* (2006.01)
*G06F 9/455* (2018.01)

(52) U.S. Cl.
CPC ...... *G06F 11/3428* (2013.01); *G06F 9/45558* (2013.01); *G06F 2009/45562* (2013.01); *G06F 2009/45591* (2013.01)

(58) Field of Classification Search
CPC . G06F 2009/45591; G06F 2009/45562; G06F 9/45558; G06F 11/3428
USPC ......................................................... 702/186
See application file for complete search history.

(56) References Cited

U.S. PATENT DOCUMENTS

| 8,522,339 | B2 * | 8/2013 | Ohto ................... G06F 11/3428 726/19 |
| 10,613,961 | B2 * | 4/2020 | Chen ....................... G06F 9/455 |
| 2013/0332610 | A1 | 12/2013 | Beveridge | |
| 2015/0089292 | A1 | 3/2015 | Ueda | |
| 2016/0364259 | A1 | 12/2016 | Yoshida | |
| 2019/0243687 | A1 * | 8/2019 | Chen ..................... G06F 9/5072 |

FOREIGN PATENT DOCUMENTS

| JP | 2015-518997 A | 7/2015 |
| JP | 2016-522947 A | 8/2016 |
| JP | 2017-4266 A | 1/2017 |
| JP | 2018-28767 A | 2/2018 |
| WO | 2014/189899 A1 | 11/2014 |
| WO | 2015/045031 A1 | 4/2015 |

OTHER PUBLICATIONS

Japanese Office Action dated Feb. 8, 2022 for corresponding Japanese Patent Application No. 2018-085241, with English Translation, 7 pages.

* cited by examiner

*Primary Examiner* — John H Le
(74) *Attorney, Agent, or Firm* — Fujitsu Patent Center

(57) ABSTRACT

A resource management apparatus includes a memory and a processor coupled to the memory. The processor is configured to receive a usage of a target virtual machine provided to a user and a request benchmark score requested by the user. The processor is configured to determine first resources to be used for constructing the target virtual machine based on the received usage and request benchmark score. The processor is configured to construct a first virtual machine using the first resources.

9 Claims, 14 Drawing Sheets

FIG. 1

| Media and Entertainment | 3.11 | | Financial Services | 3.1 |
|---|---|---|---|---|
| Blender | 1.16 | | Monte Carlo | 5.07 |
| HandBrake | 1.23 | | Black Scholes | 1.62 |
| LuxRender | 1.27 | | Binomial | 3.07 |
| IOMeter | 7.37 | | | |
| Maya | 21.84 | | | |
| Product Development | 3.65 | | Energy | 3.43 |
| Rodinra | 1.51 | | FFTW | 2.18 |
| Calculix | 3.31 | | Convolution | 0.84 |
| WPCcfd | 1.77 | | Energy-01 | 87.18 |
| IOMeter | 9.62 | | srmp | 1.28 |
| Catia-01 | 15.25 | | Kirchhoff Migration | 1.27 |
| Creo-01 | 11.45 | | Poisson | 1.98 |
| Showcase 01 | 12.22 | | IOMeter | 10.84 |
| Snx 02 | 11.32 | | | |
| Sw 03 | 5.74 | | | |
| Life Sciences | 3.61 | | General Operations | 1.54 |
| Lammps | 1.41 | | 7Zip | 0.62 |
| namd | 1.29 | | Python | 1.15 |
| Rodinia | 1.64 | | Octave | 1.04 |
| Medical-01 | 19.66 | | IOMeter | 7.67 |
| IOMeter | 10.43 | | | |

FIG. 2A

| ITEM/BENCHMARK PROGRAM | SCORE | WEIGHT | CALCULATION FORMULA |
|---|---|---|---|
| Media and Entertainment | 3.11 | | 1.16^(0.2)x1.23^(0.2)x1.27^(0.2)x7.37^(0.2)x21.84^(0.2) |
| Blender | 1.16 | 0.2 | |
| HandBrake | 1.23 | 0.2 | |
| LuxRender | 1.27 | 0.2 | |
| IOMeter | 7.37 | 0.2 | |
| Maya | 21.84 | 0.2 | |

FIG. 2B

| ITEM/SYSTEM | SCORE | WEIGHT | CALCULATION FORMULA |
|---|---|---|---|
| Media and Entertainment | 3.11 | | 1.22^(0.6)x21.84^(0.2)x7.37^(0.2) |
| CPU | 1.22 | 0.6 | |
| GFX | 21.84 | 0.2 | |
| IO | 7.37 | 0.2 | |

FIG. 2C

| ITEM/SYSTEM | SCORE | WEIGHT | CALCULATION FORMULA |
|---|---|---|---|
| Media and Entertainment | 2.6k | | k^(0.6)x(20k)^(0.2)x(6k)^(0.2) |
| CPU | k | 0.6 | |
| GFX | 20k | 0.2 | |
| IO | 6k | 0.2 | |

FIG. 6A

| (CPU+DIMM) LEVEL | (CPU+DIMM) CONFIGURATION | EXPECTED SCORE ||||||
|---|---|---|---|---|---|---|---|
| | | M&E | PD | LS | FS | E | GO |
| ... | ... | ... | ... | ... | ... | ... | ... |
| 5 | 2Core(MEDIUM FREQUENCY)+8GB | 5.0 | 5.1 | 5.2 | 5.3 | 5.4 | 5.5 |
| 4 | 2Core(LOW FREQUENCY)+8GB | 4.0 | 4.1 | 4.2 | 4.3 | 4.4 | 4.5 |
| 3 | 1Core(HIGH FREQUENCY)+4GB | 3.0 | 3.1 | 3.2 | 3.3 | 3.4 | 3.5 |
| 2 | 1Core(MEDIUM FREQUENCY)+4GB | 2.0 | 2.1 | 2.2 | 2.3 | 2.4 | 2.5 |
| 1 | 1Core(LOW FREQUENCY)+4GB | 1.0 | 1.1 | 1.2 | 1.3 | 1.4 | 1.5 |

CPU PERFORMANCE/COMPONENT PREDICTION TABLE

FIG. 6B

| GFX LEVEL | GFX CARD CONFIGURATION | EXPECTED SCORE ||||||
|---|---|---|---|---|---|---|---|
| | | M&E | PD | LS | FS | E | GO |
| ... | ... | ... | ... | ... | ... | ... | ... |
| 5 | GFX CARD E | 21.1 | 21.3 | 21.5 | 21.7 | 21.9 | 22.1 |
| 4 | GFX CARD D | 16.1 | 16.3 | 16.5 | 16.7 | 16.9 | 17.1 |
| 3 | GFX CARD C | 11.1 | 11.3 | 11.5 | 11.7 | 11.9 | 12.1 |
| 2 | GFX CARD B | 6.1 | 6.3 | 6.5 | 6.7 | 6.9 | 7.1 |
| 1 | GFX CARD A | 1.1 | 1.3 | 1.5 | 1.7 | 1.9 | 2.1 |

GFX PERFORMANCE/COMPONENT PREDICTION TABLE

FIG. 6C

| IO LEVEL | IO STORAGE CONFIGURATION | EXPECTED SCORE ||||||
|---|---|---|---|---|---|---|---|
| | | M&E | PD | LS | FS | E | GO |
| ... | ... | ... | ... | ... | ... | ... | ... |
| 5 | PCIE SSD OR SSDXN STRIPE | 5.9 | 5.8 | 5.7 | 5.6 | 5.5 | 5.4 |
| 4 | SSDx2 stripe | 4.9 | 4.8 | 4.7 | 4.6 | 4.5 | 4.4 |
| 3 | SSD or HDDxn | 3.9 | 3.8 | 3.7 | 3.6 | 3.5 | 3.4 |
| 2 | HDDx2 stripe | 2.9 | 2.8 | 2.7 | 2.6 | 2.5 | 2.4 |
| 1 | HDD | 1.9 | 1.8 | 1.7 | 1.6 | 1.5 | 1.4 |

IO PERFORMANCE/COMPONENT PREDICTION TABLE

FIG. 12

| TARGET COMPONENT/ID | CPU+DIMM/1 | GFX CARD/2 | STORAGE/3 |
|---|---|---|---|
| ADJUSTMENT COMPONENT | GFX CARD | CPU+DIMM | CPU+DIMM |

RESOURCE MANAGEMENT APPARATUS AND RESOURCE MANAGEMENT METHOD

CROSS-REFERENCE TO RELATED APPLICATION

This application is based upon and claims the benefit of priority of the prior Japanese Patent Application No. 2018-085241, filed on Apr. 26, 2018, the entire contents of which are incorporated herein by reference.

FIELD

The embodiments discussed herein are related to a resource management apparatus and a resource management method.

BACKGROUND

In a cloud service, a resource management apparatus that manages a resource group of a cloud system allocates resources to a user on a component basis. The components may include a CPU (Central Processing Unit), a memory, a storage, and a graphic card.

The user designates a CPU with the number of cores, designates a memory with an amount such as x gigabyte, designates a storage with an amount such as y terabyte, and designates a graphic card with a graphic card name.

FIG. 14 is a view for explaining a resource designation of the related art. In FIG. 14, a memory is represented by DIMM (Dual Inline Memory Module). As illustrated in FIG. 14, a user designates a component for a resource management apparatus 9. The resource management apparatus 9 constructs a VM (Virtual Machine) based on the designated component and provides the VM to the user.

In the related art, there has been proposed a technique for monitoring the performance of a computer resource service in real time by starting a test virtual machine on a computer system of the computer resource service and monitoring various metrics representing the performance of the test virtual machine over time.

In the related art, three has been also proposed a technique for facilitating provisioning of a virtual desktop infrastructure having virtual shared storage. In this technique, a provisioning manager receives the type of desktop pool and provisions virtual shared storage among hosts of a cluster. The provisioning manager also configures virtual shared storage based on the type of desktop pool and provisions at least one virtual machine to each host in the host cluster. Then, the provisioning manager receives a storage performance benchmark from each host. Then, if the result of the storage performance benchmark does not satisfy a threshold value within a predetermined tolerance, the provisioning manager optimizes the virtual shared storage by performing optimization on the host cluster.

Related techniques are disclosed in, for example, Japanese National Publication of International Patent Application No. 2016-522947 and Japanese National Publication of International Patent Application No. 2015-518997.

The resource designation of the related art illustrated in FIG. 14 has a problem in that a VM suitable for the performance requested by the user is not constructed. A cloud system resource group includes a CPU, memory, and storage having various performances, and the performance of a VM to be constructed is not determined only with the number of cores of the CPU, the memory amount, the storage amount, and the graphic card. In addition, the performance of the VM to be constructed is affected not only by the single performance of individual components, but also by the performance when operating in cooperation among the components.

SUMMARY

According to an aspect of the present invention, provide is a resource management apparatus including a memory and a processor coupled to the memory. The processor is configured to receive a usage of a target virtual machine provided to a user and a request benchmark score requested by the user. The processor is configured to determine first resources to be used for constructing the target virtual machine based on the received usage and request benchmark score. The processor is configured to construct a first virtual machine using the first resources.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 1 is a view illustrating an example of an output of a benchmark score;

FIGS. 2A to 2C are views for explaining a method of calculating a benchmark score of an item;

FIGS. 6A to 6C are views illustrating an example of a prediction information storage unit;

FIG. 12 is a view illustrating an example of an adjustment component;

DESCRIPTION OF EMBODIMENTS

Figure 3:
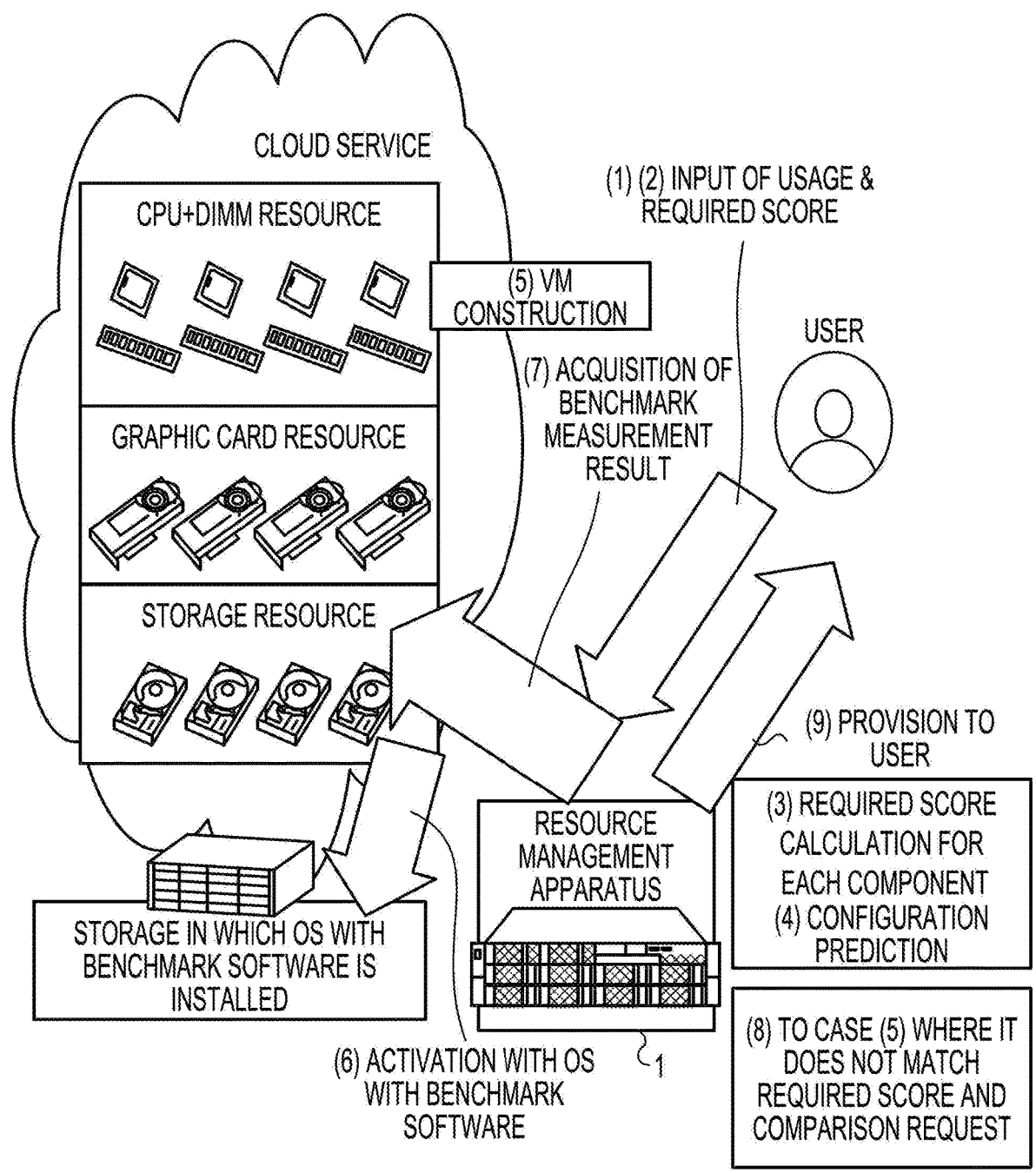
FIG. 3 is a view for explaining a resource allocation method by a resource management apparatus according to a first embodiment.

Hereinafter, embodiments will be described in detail with reference to the accompanying drawings. In addition, the embodiments do not limit the disclosed techniques.

First Embodiment

A resource management apparatus according to a first embodiment allocates resources based on a benchmark score. First, the benchmark score will be described with reference to FIGS. 1 to 2. FIG. 1 is a view illustrating an example of an output of a SPECwpc® benchmark score. The SPECwpc benchmark score is a performance index for workstation.

As illustrated in FIG. 1, the SPECwpc benchmark score indicates the performance for six items of Media and Entertainment, Product Development, Life Sciences, Financial Services, Energy, and General Operations. Media and Entertainment is used for applications such as moving picture creation/edition, and Product Development is used for applications such as CAD and fluid calculation. Life Sciences is used for applications such as molecular motion simulation. Financial Services is used for applications such as option simulation, and Energy is used for applications such as earthquake fault simulation. General Operations is used for general applications and applications such as zip decompression.

The benchmark score of each item is calculated from benchmark scores of plural benchmark programs. For example, Media and Entertainment is calculated from the benchmark scores of Blender, HandBrake, LuxRender, IOMeter, and Maya.

Benchmark scores are published on general Web sites and are mainly used for users to, for example, select a device when purchasing, leasing or renting the device. When a user wants to replace his/her own device at the end of support of the device, and the user is satisfied with the current performance of the device, the user only has to purchase a device with the same benchmark score. At that time, which item's benchmark score is to be referred to is determined based on the user's intended use.

Further, for example, when the user wants to double the processing performance (to reduce the processing time to half) while keeping, for example, an OS (Operating System) or application as they are, the user only has to purchase a device having twice the benchmark score. However, since a program actually used by the user is not the same as a benchmark program, even when the benchmark score is doubled, the processing performance is not necessarily doubled. However, the benchmark score enables such performance conversion with high accuracy.

FIGS. 2A to 2C are views for explaining a method of calculating a benchmark score of an item. In the following, "benchmark score" is expressed simply as "score." As illustrated in FIG. 2A, a score "3.11" of Media and Entertainment is calculated "$1.16^{(0.2)} \times 1.23^{(0.2)} \times 1.27^{(0.2)} \times 7.37^{(0.2)} \times 21.84 \times^{(0.2)}$." Here, $p^q$ represents $p^q$. Further, the scores of the respective benchmark programs are "1.16," "1.23," "1.27," "7.37," and "21.84," and the weights of the respective benchmark program are all equal to "0.2."

Blender, HandBrake, and LuxRender are benchmark programs mainly related to a CPU system (CPU and DIMM), IOMeter is a benchmark program of an IO system (input/output to storage), and Maya is a benchmark program of a GFX system (graphics). For this reason, FIG. 2A can be simply represented as illustrated in FIG. 2B. In FIG. 2B, "1.22" of the CPU system is the geometric mean of three scores. In this manner, the scores of items such as Media and Entertainment are affected by the scores of the CPU system, the GFX system, and the IO system.

Assuming that the ratio between the CPU system, the GFX system, and the IO system is 1:20:6 based on FIG. 2B, FIG. 2B can be rewritten as illustrated in FIG. 2C. From FIG. 2C, when the scores of the items such as Media and Entertainment are determined, the scores of the CPU system, the GFX system, and the IO system are determined. That is, k can be calculated from the item's scores, and the score of each of the CPU system, the GFX system, and the IO system can be calculated.

Next, a resource allocation method by the resource management apparatus according to the first embodiment will be described. FIG. 3 is a view for explaining a resource allocation method by the resource management apparatus according to the first embodiment.

As illustrated in FIG. 3, a user who requests resource allocation inputs a usage and a required score (1, 2). The resource management apparatus 1 according to the first embodiment calculates a required score for each component based on the usage and the required score input by the user (3), and predicts a necessary component configuration (4). Further, the resource management apparatus 1 handles the CPU and the DIMM as one component. That is, the resource management apparatus 1 predicts the configuration of CPU+DIMM based on the scores of the CPU system, predicts the configuration of GFX card (graphic card) based on the scores of the GFX system, and predicts the configuration of storage based on the scores of the IO system.

Then, the resource management apparatus 1 constructs a VM based on the predicted component configuration (5), and activates the constructed VM with an operating system (OS) with benchmark software (6). Then, the resource management apparatus 1 acquires a benchmark measurement result (7) and compares the acquired benchmark measurement result with the required score (8).

When the benchmark measurement result is smaller than the required score or larger than necessary, that is, when the benchmark measurement result does not match a user's request, the resource management apparatus 1 changes the component configuration and returns to the construction of the VM. In the meantime, when the benchmark measurement result matches the user's request, the resource management apparatus 1 provides the constructed VM to the user (9).

In this manner, the resource management apparatus 1 constructs a VM by predicting the resource configuration based on the usage and the required score, and activates the constructed VM with the OS with benchmark software to acquire the benchmark measurement result. Then, the resource management apparatus 1 changes the resource configuration, and repeats the construction of the VM and the acquisition of the benchmark measurement result until the benchmark measurement result matches the user's request. Therefore, the resource management apparatus 1 may provide a VM suitable for the performance requested by the user.

Figure 4:
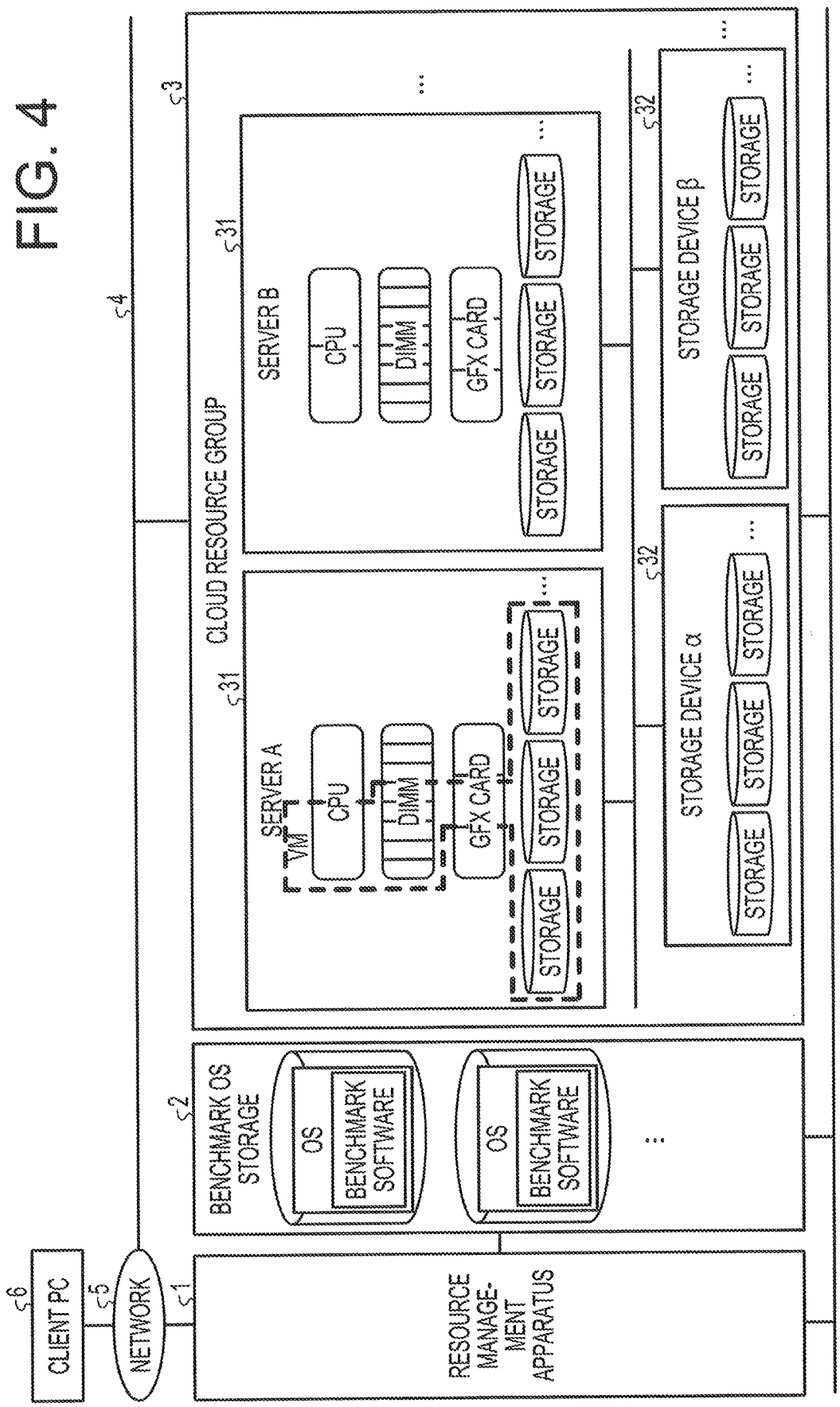
FIG. 4 is a view illustrating the configuration of a cloud system according to the first embodiment.

Next, the configuration of a cloud system according to the first embodiment will be described. FIG. 4 is a view illustrating the configuration of a cloud system according to the first embodiment. As illustrated in FIG. 4, the cloud system according to the first embodiment includes a resource management apparatus 1, a benchmark OS storage 2, and a cloud resource group 3. The resource management apparatus 1, the benchmark OS storage 2, and the cloud resource group 3 are connected to each other by a network 4. The network 4 is connected to a client PC 6 used by a user via another network 5.

The resource management apparatus 1 specifies a resource configuration suitable for the performance requested by the user, and provides the user with a VM having the specified resource configuration. The benchmark OS storage 2 stores an OS image in which benchmark software is installed. The cloud resource group 3 includes a CPU, a DIMM, a GFX card, and a storage which constitute a server 31, and a storage which constitutes a storage device 32. A VM is constructed using some of the CPU, DIMM, GFX card, and storage included in the cloud resource group 3.

Figure 5:
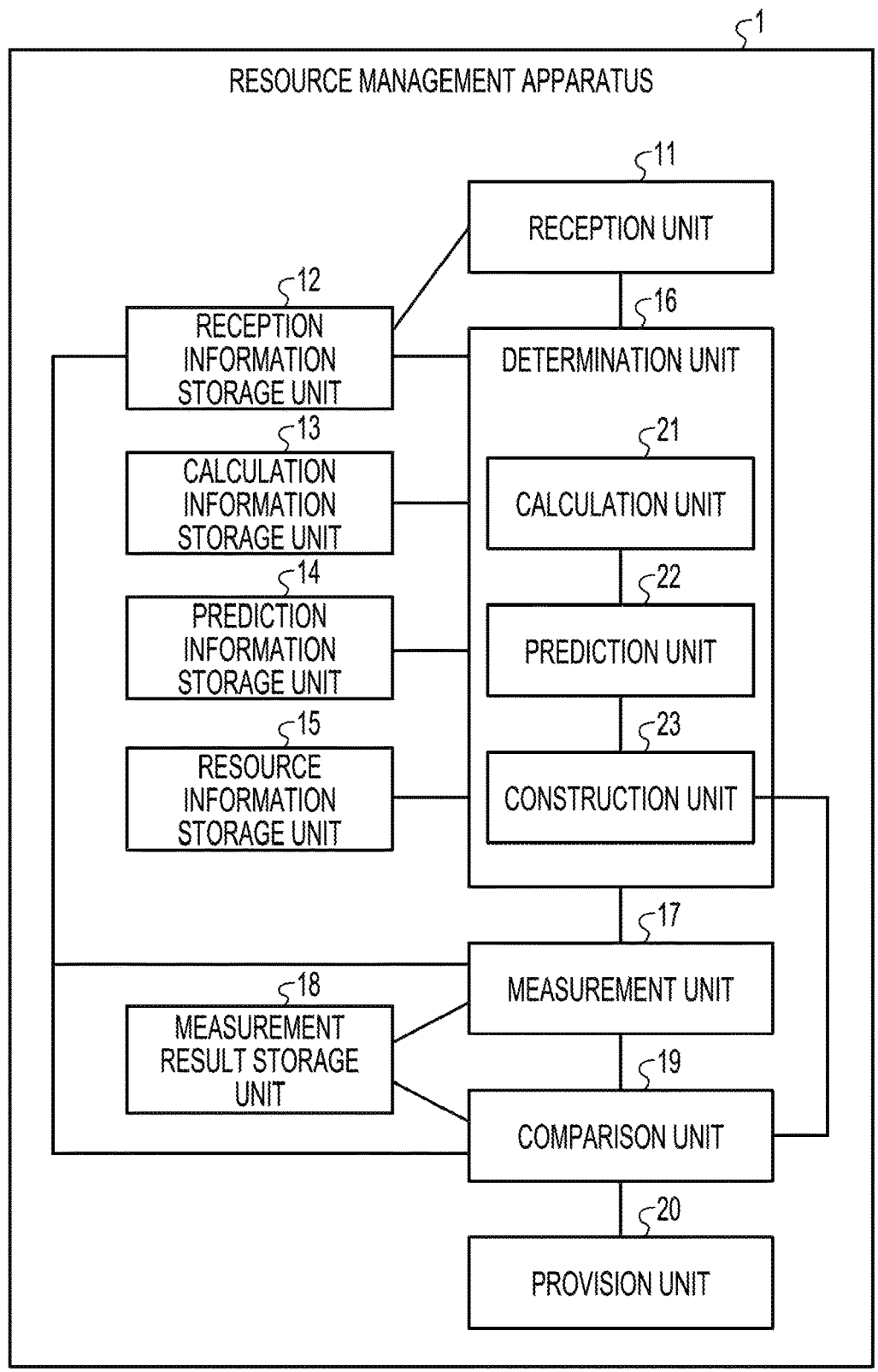
FIG. 5 is a view illustrating a functional configuration of the resource management apparatus.

FIG. 5 is a view illustrating a functional configuration of the resource management apparatus 1. As illustrated in FIG. 5, the resource management apparatus 1 includes a reception unit 11, a reception information storage unit 12, a calculation information storage unit 13, a prediction information storage unit 14, a resource information storage unit 15, a determination unit 16, a measurement unit 17, a measurement result storage unit 18, a comparison unit 19, and a provision unit 20.

The reception unit 11 receives a usage, a required score, and a storage capacity input by a user using the client PC 6, and writes the usage, the required score, and the storage capacity in the reception information storage unit 12. The storage capacity is used to determine the capacity of a storage used by the VM. The reception information storage unit 12 stores the usage, the required score, and the storage capacity received by the reception unit 11 for each user. Further, the reception information storage unit 12 stores a required score calculated for each component by a calculation unit 21 which will be described later.

The calculation information storage unit 13 stores information for calculating a required score for each component from the usage and the required score received by the reception unit 11. For example, for Media and Entertainment, the calculation information storage unit 13 stores score calculation information illustrated in FIG. 2C. The calculation information storage unit 13 stores information similar to that illustrated in FIG. 2C for other items.

The prediction information storage unit 14 stores scores for each configuration for each item regarding each of CPU, GFX, and IO. FIGS. 6A to 6C are views illustrating an example of the prediction information storage unit 14. As illustrated in FIGS. 6A to 6C, the prediction information storage unit 14 stores a CPU performance/component prediction table (FIG. 6A), a GFX performance/component prediction table (FIG. 6B), and an IO performance/component prediction table (FIG. 6C).

The CPU performance/component prediction table represents scores for each configuration for each item regarding the CPU performance, the GFX performance/component prediction table represents scores for each configuration for each item regarding the GFX performance, and the IO performance/component prediction table represents scores for each configuration is shown for each item regarding the IO performance.

As illustrated in FIG. 6A, the CPU performance/component prediction table associates a (CPU+DIMM) level, a (CPU+DIMM) configuration, and an expected score with each other. The (CPU+DIMM) level is the level of CPU performance. A higher (CPU+DIMM) level value indicates a higher CPU performance. The (CPU+DIMM) configuration is the configuration of CPU and DIMM, which is the number of cores of CPU, CPU frequency, and DIMM capacity.

The expected score is a score for each item. M&E represents Media and Entertainment, PD represents Product Development, LS represents Life Sciences, FS represents Financial Services, E represents Energy, and GO represents General Operations.

For example, when the (CPU+DIMM) level is "5," the CPU is "2 Core" and "medium frequency,", and the capacity of DIMM is "8 GB (gigabyte)." The scores of M&E, PD, LS, FS, E, and GO are "5.0," "5.1," "5.2," "5.3," "5.4," and "5.5," respectively.

As illustrated in FIG. 6B, the GFX performance/component prediction table associates a GFX level, a GFX card configuration, and an expected score with each other. The GFX level is the level of GFX performance. A higher GFX level value indicates a higher GFX performance. The GFX card configuration is the type of GFX card.

For example, when the GFX level is "5," the type of GFX card is "GFX card E," and the scores of M&E, PD, LS, FS, E, and GO are "21.1," "21.3," "21.5," "21.7," "21.9,", and "22.1," respectively.

As illustrated in FIG. 6C, the IO performance/component prediction table associates an IO level, a storage configuration, and an expected score with each other. The IO level is the level of IO performance. A higher IO level value indicates a higher IO performance. The storage configuration is the type of storage.

For example, when the IC level is "5," the storage type is "PCIe SSD" or "SSD×n stripe," and the scores of M&E, PD, LS, FS, E, and GO are "5.9," "5.8," "5.7," "5.6," "5.5,", and "5.4."

Referring back to FIG. 5, the resource information storage unit 15 stores information on resources such as location, and usability for each resource. For the CPU, the resource information storage unit 15 stores information such as the number of cores, and a frequency. For the DIMM, the resource information storage unit 15 stores information such as capacity. For the GFX card, the resource information storage unit 15 stores information such as the type of card. For the storage, the resource information storage unit 15 stores information such as the type of storage.

The determination unit 16 uses the reception information storage unit 12, the calculation information storage unit 13, the prediction information storage unit 14, and the resource information storage unit 15 to determine a resource configuration for constructing a VM, and constructs the VM with the determined resource configuration. The determination unit 16 includes a calculation unit 21, a prediction unit 22, and a construction unit 23.

The calculation unit 21 reads a usage and a required score from the reception information storage unit 12, calculates a required score for each component based on the calculation information storage unit 13, and stores the score in the reception information storage unit 12.

The prediction unit 22 predicts a component configuration that satisfies the required score for each component based on the prediction information storage unit 14. That is, for the CPU and the DIMM, the prediction unit 22 selects a (CPU+DIMM) configuration with the lowest (CPU+DIMM) level among the configurations with their expected scores in FIG. 6A larger than the required score of the CPU. For the GFX card, the prediction unit 22 selects a GFX card configuration with the lowest GFX level among the configurations with their expected scores in FIG. 6B larger than the required score of the GFX card. For the storage, the prediction unit 22 selects a storage configuration with the lowest IO level among the configurations with their expected scores of FIG. 6C larger than the required score of the IO.

The construction unit 23 refers to the resource information storage unit 15 to determine whether or not a VM can be constructed using the (CPU+DIMM) configuration, the GFX card configuration, and the storage configuration selected by the prediction unit 22. The case where a VM cannot be constructed may include, for example, a case where a resource selected by the prediction unit 22 cannot be used, and a case where resources cannot be combined due to a long distance between the resources.

When the VM can be constructed, the construction unit 23 constructs the VM. Meanwhile, when the VM cannot be constructed, the construction unit 23 determines a resource configuration capable of constructing a VM by raising one of the (CPU+DIMM) level, the GFX card level, and the storage level and constructs a VM with the determined resource configuration.

The measurement unit 17 instructs the server 31 in which a VM is constructed, to activate the VM by loading an OS image of usage from the benchmark OS storage 2. Then, when the VM is actuated and the benchmark software is executed, the measurement unit 17 acquires a measurement score for each component measured by the benchmark software from the server 31, and stores the measurement score in the measurement result storage unit 18. The measurement result storage unit 18 stores the measurement score measured by the benchmark software for each component.

The comparison unit 19 compares the measurement score stored for each component by the measurement result storage unit 18 with a required score stored for each component by the reception information storage unit 12, to determine whether or not the VM constructed by the construction unit 23 matches a user's request. Then, when the VM constructed by the construction unit 23 matches the user's request, the comparison unit 19 completes the construction of the VM. When the VM does not match the user's request, the comparison unit 19 designates a performance level for each component and requests the construction unit 23 to reconstruct the VM. Here, the performance level may include the (CPU+DIMM) level, the GFX level, and the IO level.

Figure 7A:
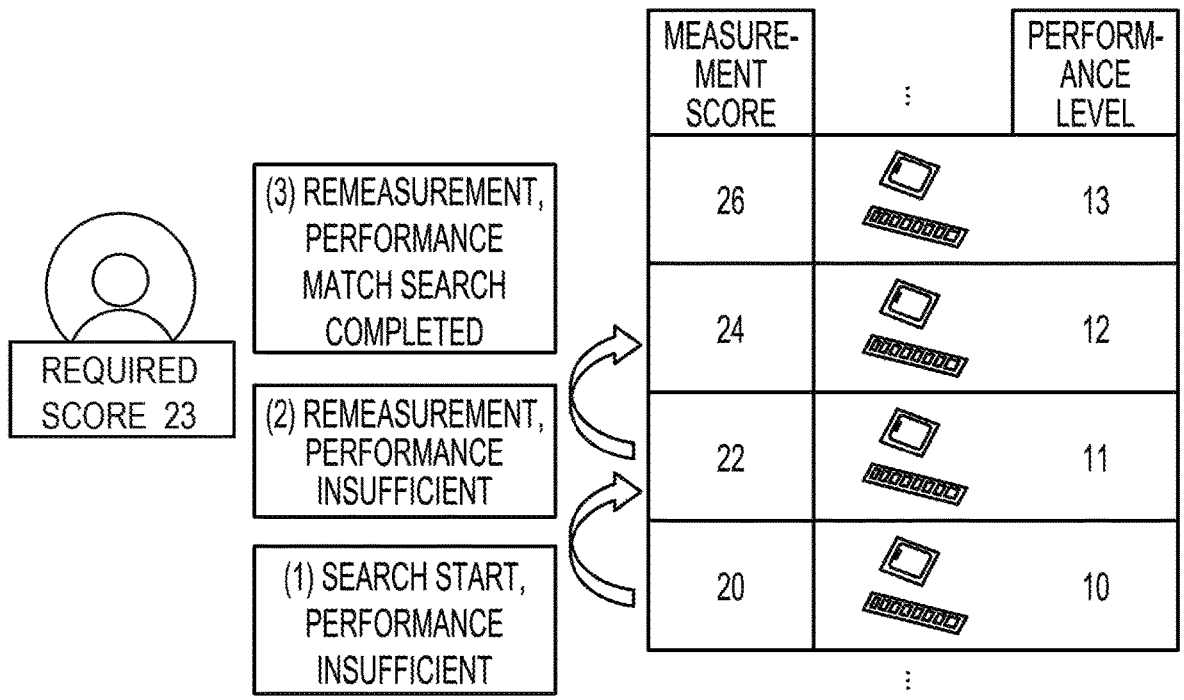
FIGS. 7A and 7B are views for explaining a performance level search by a repetition of a VM reconstruction, a score measurement, and a score comparison.
Figure 7B:
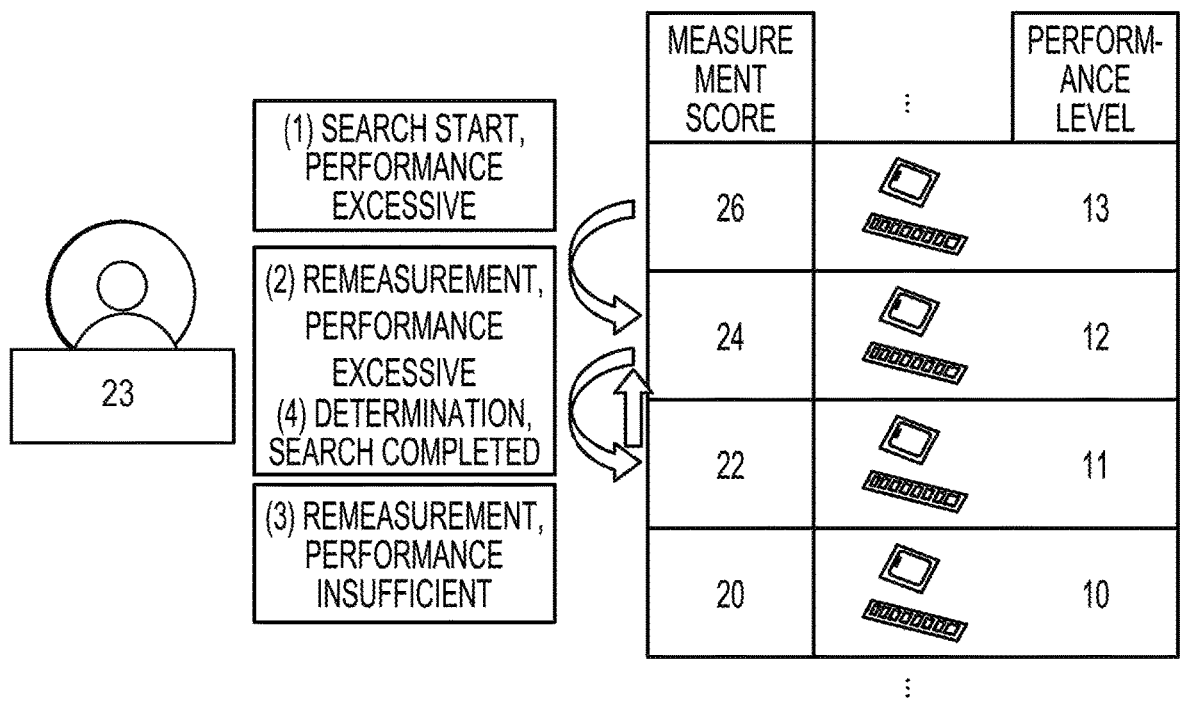

FIGS. 7A and 7B are views for explaining performance level search by repetition of VM reconstruction, score measurement, and score comparison. FIG. 7A illustrates a case where a performance level is raised to reach a performance level matching a user's request, and FIG. 7B illustrates a case where a performance level is lowered to reach a performance level matching a user's request. In FIGS. 7A and 7B, it is assumed that a required score requested by a user for a component is "23."

As illustrated in FIG. 7A, when the first measurement score is "20" and the performance is insufficient (1), the comparison unit 19 raises the performance level from "10" to "11" and requests the construction unit 23 to reconstruct a VM. Then, as a result of remeasurement after the reconstruction, the measurement score becomes "22." Since the performance is insufficient with this measurement score (2), the comparison unit 19 raises the performance level from "11" to "12" and requests the construction unit 23 to reconstruct the VM. Then, as a result of the remeasurement after the reconstruction, the measurement score becomes "24." Since this measurement score exceeds the score "23" requested by the user, the measurement score matches the performance required by the user (3). Therefore, it is determined that the configuration with the performance level of "12" matches the user's request.

Further, as illustrated in FIG. 7B, when it is estimated that the first measurement score is "26" and the performance is excessive, the comparison unit 19 lowers the performance level from "13" to "12" and requests the construction unit 23 to reconstruct the VM. Then, as a result of remeasurement after the reconstruction, the measurement score becomes "24." When it is estimated that the performance is excessive with this measurement score, the comparison unit 19 lowers the performance level from "12" to "11" and requests the construction unit 23 to reconstruct the VM. Then, as a result of the remeasurement after the reconstruction, the measurement score becomes "22." Since this measurement score is lower than the score "23" requested by the user, the previous measurement score "24" matches the performance required by the user. Therefore, it is determined that the configuration with the performance level of "12" matches the user's request.

Referring back to FIG. 5, the provision unit 20 provides the user with the VM determined by the comparison unit 19 to match the user's request.

In addition, since the prediction unit 22 predicts the component configuration based on the required score for each component, it may be conceivable that the VM is provided to the user based on the component configuration predicted by the prediction unit 22. However, a difference in performance occurs due to a difference between physical locations of the (CPU+DIMM), the GFX card, and the storage (physical distances on the electric/electronic circuit wirings in the server 31 or on a network connecting the server 31 and the storage device 32).

For example, since the CPU and the storage have various connection configurations as follows, in a case where the physical position of the CPU differs from that of the storage, the IO performance varies.
Connection via chipset
Connection via RAID (Redundant Arrays of Inexpensive Disks) card
Connection from network card (SAN)
Connection to PCIe lane of CPU (PCIe-SSD (Solid State Drive))
Connection to PCIe lane of CPU connected by interconnect (PCIe-SSD)

There is also a performance difference due to combination of components. For example, in the case of IO, the major factor of the IO benchmark is a throughput and latency of storage, but since the CPU performs a reading/writing process, the CPU's capability also influences the IO benchmark. Especially when the CPU performance is low, the influence is relatively large.

Therefore, the resource management apparatus 1 decides the resource configuration while repeating the resource configuration change and the benchmark measurement with the resource configuration predicted by the prediction unit 22 as the initial configuration.

Figure 8:
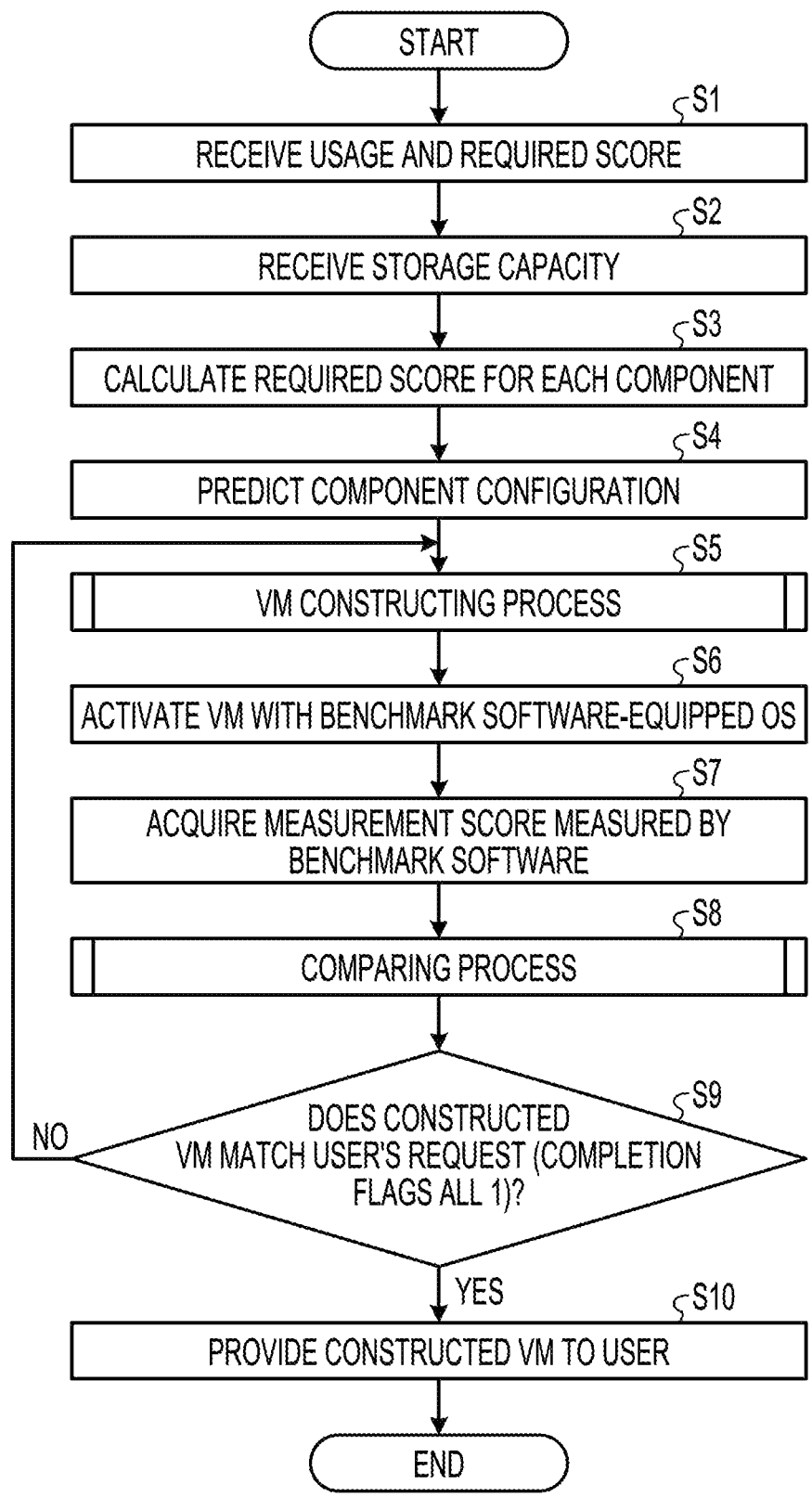
FIG. 8 is a flowchart illustrating a flow of processing by the resource management apparatus.

Next, a flow of processing by the resource management apparatus 1 will be described. FIG. 8 is a flowchart illustrating a flow of processing by the resource management apparatus 1. As illustrated in FIG. 8, the resource management apparatus 1 receives a usage and a required score from a user (step S1) and receives a storage capacity (step S2).

Then, the resource management apparatus 1 calculates a required score for each component based on the usage and the required score received from the user (step S3) and predicts a component configuration (step S4). Then, the resource management apparatus 1 executes a VM constructing process for constructing a VM (step S5) and activates the constructed VM with a benchmark software-equipped OS (step S6).

Then, the resource management apparatus 1 acquires a measurement score measured by the benchmark software (step S7) and executes a comparing process (step S8). Here, the comparing process is a process of comparing a required score requested by the user and the measured measurement score for each component to determine whether or not the constructed VM matches the user's request.

Then, the resource management apparatus 1 determines whether or not the constructed VM matches the user's request (step S9). The resource management apparatus 1 determines whether or not the constructed VM matches the user's request by determining whether or not completion flags for each component indicating whether the constructed VM matches (1) or does not match (0) the user's request are all 1. Each of the completion flags is set in the comparing process.

Then, when the constructed VM does not match the user's request, the resource management apparatus 1 designates a performance level and returns to step S5. When the constructed VM does not match the user's request, the resource management apparatus 1 matches the user's request, the resource management apparatus 1 provides the constructed VM to the user (step S10).

In this manner, since the resource management apparatus 1 constructs a VM based on the usage and the required score received from the user, it is possible to construct the VM matching the user's request.

Figure 9:
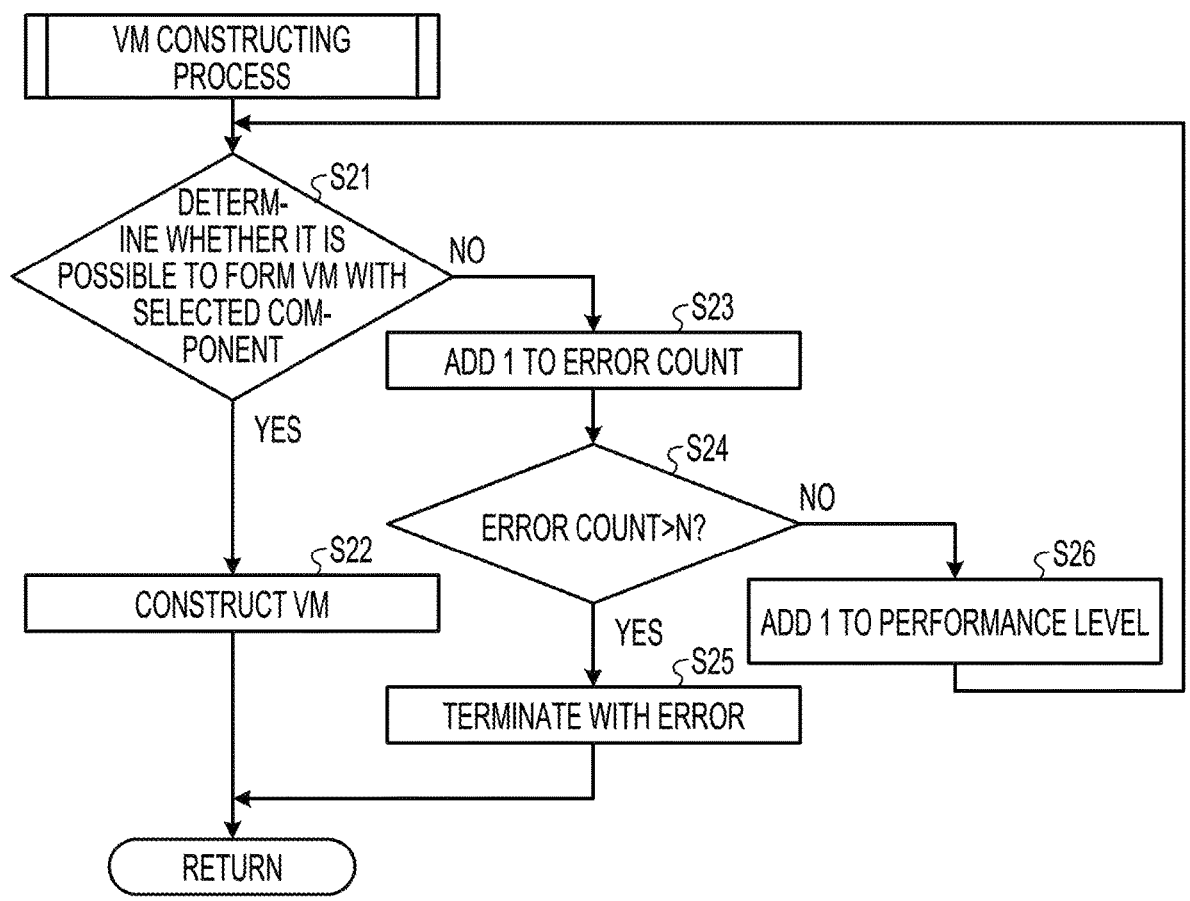
FIG. 9 is a flowchart illustrating a flow of a VM constructing process.

Next, a flow of the VM constructing process will be described. FIG. 9 is a flowchart illustrating a flow of the VM constructing process. The VM constructing process is performed for (CPU+DIMM), GFX card, and storage. As illustrated in FIG. 9, the construction unit 23 determines whether it is possible to form a VM with the selected component (step S21). When it is possible to form a VM, the construction unit 23 constructs the VM (step S22).

Meanwhile, when a VM cannot be formed with the selected component, the construction unit 23 adds 1 to an error count (step S23). Here, the error count is the number of times of the determination that a VM cannot be formed, and the initial value of the error count is 0. Then, the construction unit 23 determines whether or not the error count is larger than n (step S24). When the error count is larger than n, the construction unit 23 terminates with an error (step S25). Here, n is an integer threshold value. Meanwhile, when the error count is not larger than n, the construction unit 23 adds 1 to the performance level (step S26) and returns to step S21.

In this way, when a VM cannot be formed with the selected component, the construction unit 23 may specify a component that can form a VM by raising the performance level.

Figure 10:
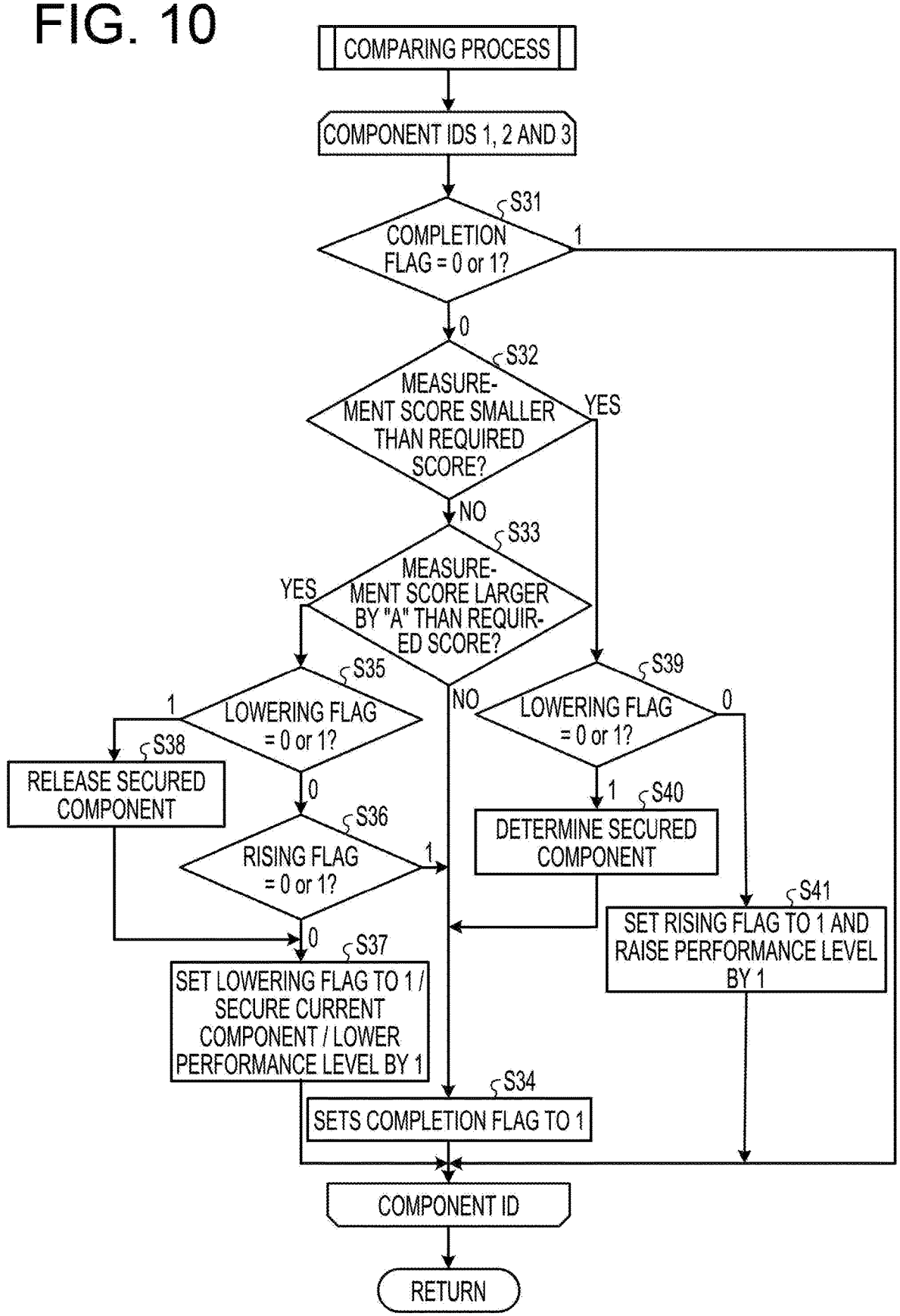
FIG. 10 is a flowchart illustrating a flow of a comparing process.

Next, a flow of the comparing process will be described. FIG. 10 is a flowchart illustrating a flow of the comparing process. As illustrated in FIG. 10, the comparison unit 19 repeats the processing of the following steps S31 to S41 while changing a component IDs from 1 to 3. Here, the component ID is an identifier for identifying a component. The component ID of the (CPU+DIMM) is 1, the component ID of the GFX card is 2, and the component ID of the storage is 3.

The comparison unit 19 determines whether a completion flag is 0 or 1 (step S31). When it is determined that the completion flag is 1, the comparison unit 19 processes the next component. When it is determined that the completion flag is 0, the comparison unit 19 determines whether or not a measurement score is smaller than a required score (step S32).

When it is determined that the measurement score is not smaller than the required score, the comparison unit 19 determines whether or not the measurement score is larger by "a" or more than the required score (step S33). Here, "a" is a threshold for determining whether or not the performance is excessively high. When it is determined that the measurement score is larger by "a" or more than the required score, it means that the performance is excessively high.

When it is determined that the measurement score is not larger by "a" or more than the required score, the comparison unit 19 sets the completion flag to 1 (step S34) and processes the next component. Meanwhile, when it is determined that the measurement score is larger by "a" or more than the required score, the comparison unit 19 determines whether a lowering flag is 0 or 1 (step S35). Here, the lowering flag is a flag indicating whether or not a VM is being reconstructed while the performance level is being lowered. When it is determined that the lowering flag is 1, it means that a VM is being reconstructed while the performance level is being lowered.

Then, when it is determined that the lowering flag is 0, the comparison unit 19 determines whether a rising flag is 0 or 1 (step S36). Here, the rising flag is a flag indicating whether or not a VM is being reconstructed while the performance level is being raised. When it is determined that the rising flag is 1, it means that a VM is being reconstructed while the performance level is being raised.

When it is determined that the rising flag is not 0, the comparison unit 19 proceeds to step S34. When it is determined that the rising flag is 0, the comparison unit 19 sets the lowering flag to 1, secures the current component, and lowers the performance level by 1 (step S37). Then, the comparison unit 19 processes the next component.

When it is determined in step S35 that the lowering flag is not 0, the comparison unit 19 releases the secured component (step S38) and proceeds to step S37.

When the measurement score is smaller than the required score in step S32, the comparison unit 19 determines whether the lowering flag is 0 or 1 (step S39). When it is determined that the lowering flag is not 0, the comparison unit 19 determines the secured component (step S40) and proceeds to step S34. Meanwhile, when it is determined that the lowering flag is 0, the comparison unit 19 sets the rising flag to 1 and raises the performance level by 1 (step S41). Then, the comparison unit 19 processes the next component.

In this way, the comparison unit 19 uses the measurement score, the required score, the rising flag, and the lowering flag to determine whether the performance level needs to be raised or lowered, so as to specify a component that matches the required score.

As described above, in the first embodiment, the reception unit 11 receives the usage and the required score of the VM from the user. Then, the determination unit 16 determines a resource configuration based on the usage and the required score received by the reception unit 11 and constructs the VM. Therefore, the resource management apparatus 1 may provide a VM suitable for the performance requested by the user.

In addition, in the embodiment, the measurement unit 17 uses the resource configuration determined by the determination unit 16 to execute the benchmark program to acquire a measurement score. Then, the comparison unit 19 compares the required score with the measurement score to determine whether or not the VM matches the user's request. When it is determined that the VM does not match the user's request, the comparison unit 19 causes the determination unit 16 to reconstruct the VM. Therefore, the resource management apparatus 1 may provide a VM that accurately matches the performance requested by the user.

In addition, in the embodiment, the calculation unit 21 calculates a required score for each component based on the usage and the required score of the VM. Then, the prediction unit 22 predicts a component configuration based on the required score for each component. Then, the construction unit 23 determines whether or not the VM may be actually constructed with the predicted component configuration. When it is determined that the VM may not be constructed, the construction unit 23 changes the component configuration by raising the performance of the component. Therefore, the measurement unit 17 may execute the benchmark program using the component configuration determined by the determination unit 16.

Second Embodiment

In the first embodiment, when the VM cannot be constructed with the component predicted by the prediction unit 22, the construction unit 23 changes the component configuration by raising the performance level of the component. However, it may be conceivable to raise the performance level of one component while lowering the performance level of another component. A second embodiment in which the construction unit 23 raises the performance level of one component and adjusts the performance level of another component will be described below.

Figure 11:
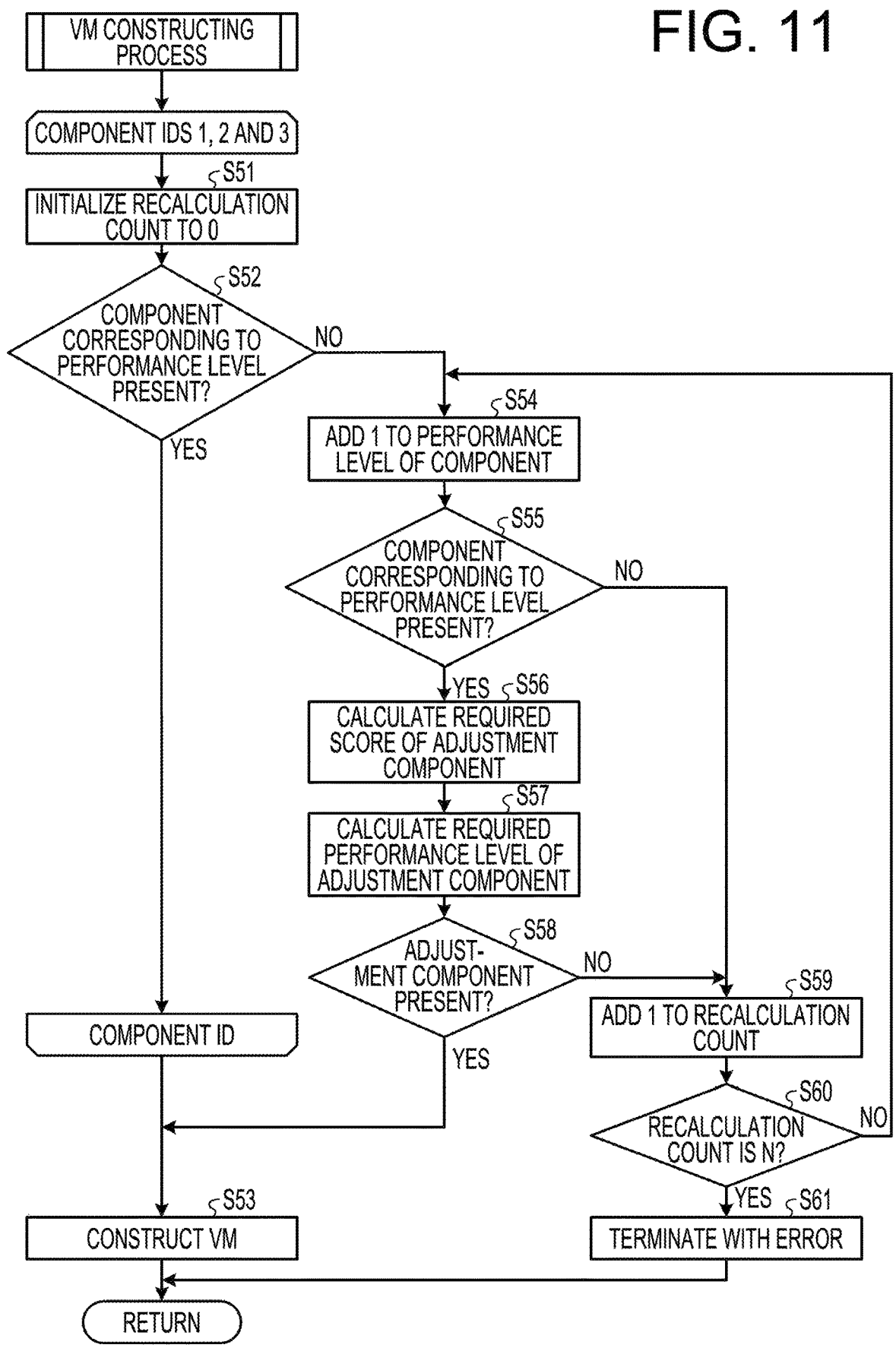
FIG. 11 is a flowchart illustrating a flow of a VM constructing process by a construction unit according to a second embodiment.

FIG. 11 is a flowchart illustrates a flow of a VM constructing process by the construction unit 23 according to the second embodiment. As illustrated in FIG. 11, the construction unit 23 according to the second embodiment initializes a recalculation count to 0 for a component whose component ID is 1 (step S51). Here, the recalculation count is to count the number of times for raising the performance level.

Next, the construction unit 23 according to the second embodiment determines whether or not there is a component corresponding to the performance level (step S52). In some cases, the construction unit 23 returns to step S51 and processes the next component. When there is a component corresponding to the performance level among three components, the construction unit 23 constructs a VM (step S53).

Meanwhile, when there is no component corresponding to the performance level, the construction unit 23 according to the second embodiment adds 1 to the performance level of the component (step S54) and determines whether or not there is a component corresponding to the performance level (step S55). Then, when it is determined that there is a component corresponding to the performance level, the construction unit 23 according to the second embodiment calculates a required score of an adjustment component (step S56). Here, the adjustment component is a component for adjusting the raise of the performance level and includes two components other than the component whose performance level has been raised.

Then, the construction unit 23 according to the second embodiment calculates a required performance level of the adjustment component (step S57) and determines whether or not there is an adjustment component (step S58). When it is determined that there is an adjustment component, the construction unit 23 according to the second embodiment proceeds to step S53.

Meanwhile, when none of the two adjustment components is present, or when it is determined in step S55 that there is no component corresponding to the performance level, the construction unit 23 according to the second embodiment adds 1 to the recalculation count (step S59). Then, the construction unit 23 according to the second embodiment determines whether or not the recalculation count is n (step S60). When it is determined that the recalculation count is not n, the construction unit 23 returns to step S54. When it is determined that the recalculation count is n, the construction unit 23 terminates with an error (step S61).

As described above, in the second embodiment, when the performance level of a certain component is raised, the construction unit 23 recalculates the required score of the adjustment component, thereby preventing a VM from being constructed with a resource configuration whose performance is unnecessarily high. FIG. 12 is a view illustrating an example of the adjustment component. As illustrated in FIG. 12, the construction unit 23 according to the second embodiment lowers the performance level of the GFX card, for example, when the performance level of the (CPU+DIMM) is raised.

When there is no component selected by the prediction unit 22, the construction unit 23 may lower the performance level instead of raising the performance level of the component and raise the performance level of the adjustment component.

While the resource management apparatus 1 has been described in the first and second embodiments, a resource management program having the same function can be obtained by implementing the configuration of the resource management apparatus 1 with software. A computer that executes the resource management program will be described below.

Figure 13:
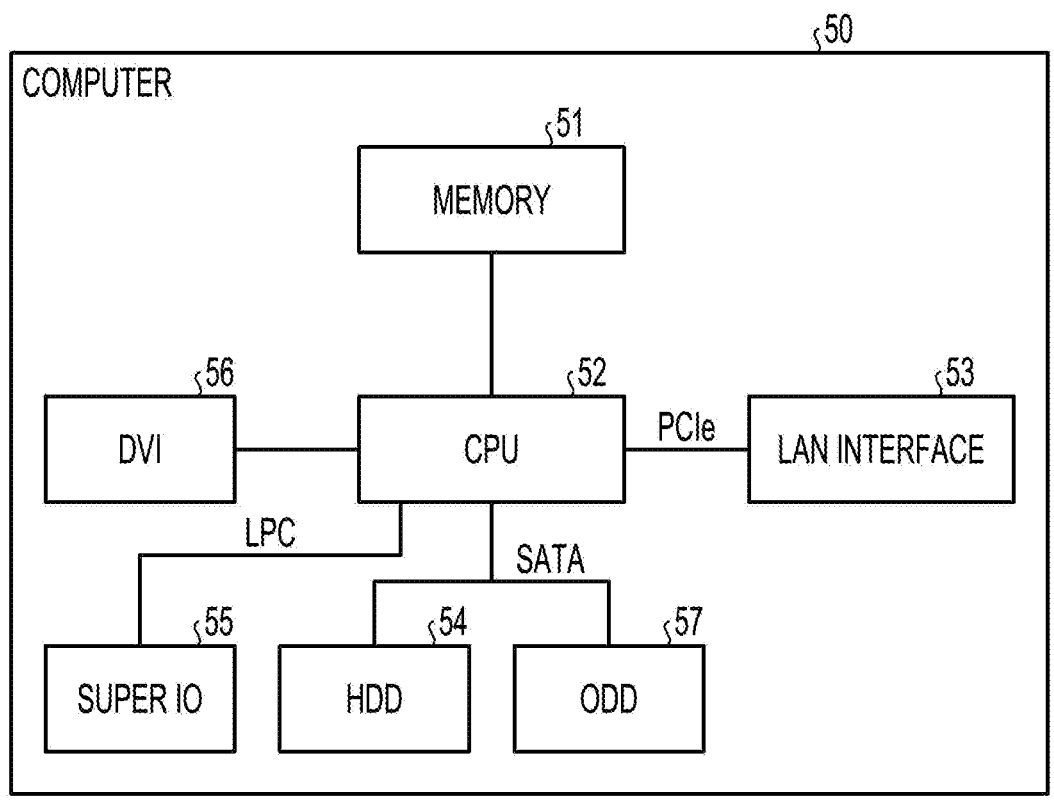
FIG. 13 is a view illustrating a hardware configuration of a computer that executes a resource management program according to the first and second embodiments.
Figure 14:
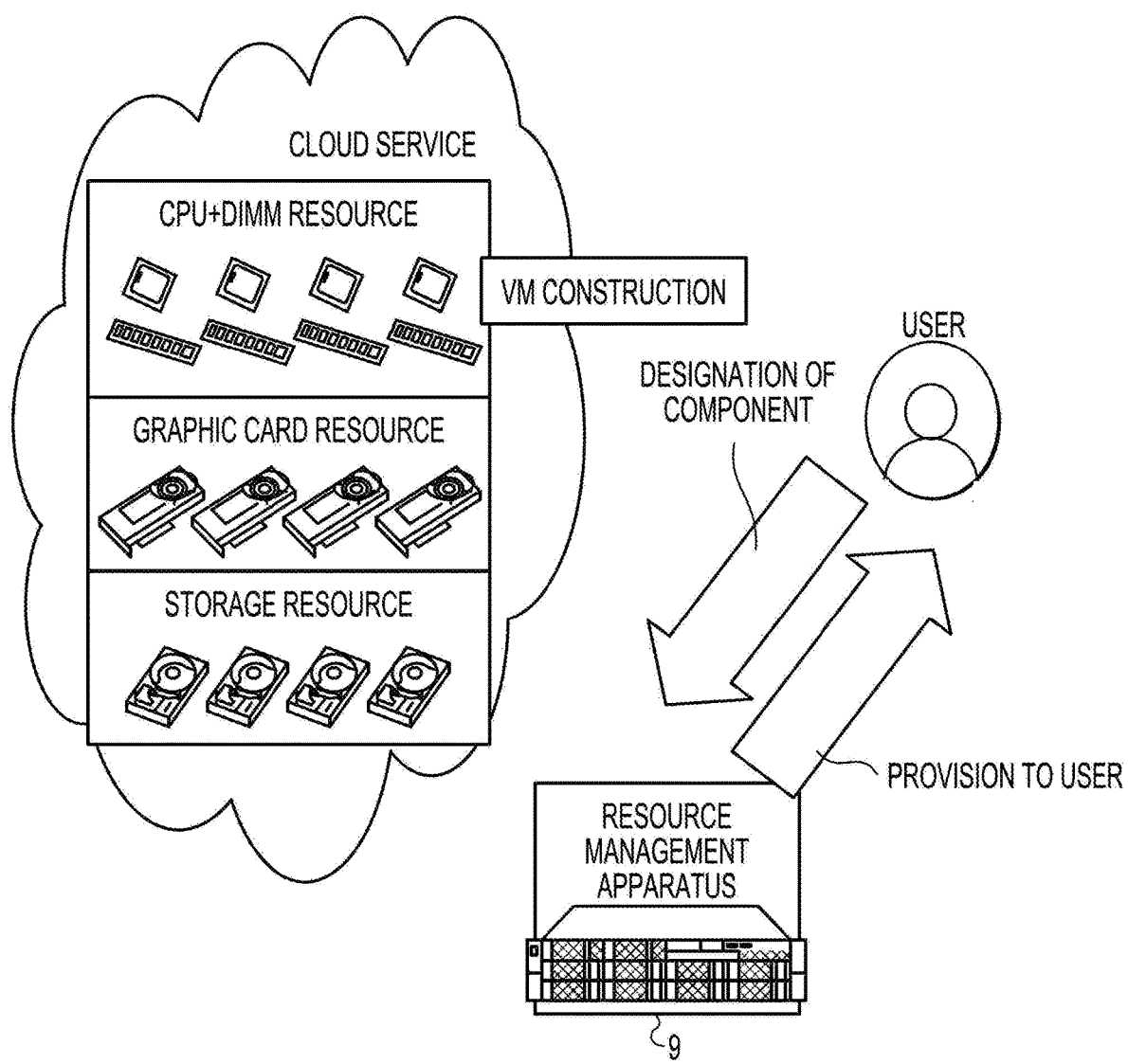
FIG. 14 is a view for explaining a resource designation of the related art.

FIG. 13 is a view illustrating a hardware configuration of a computer that executes a resource management program according to the first and second embodiments. As illustrated in FIG. 13, a computer 50 includes a memory 51, a CPU 52 which is an example of a processor, a LAN (Local Area Network) interface 53, and an HDD (Hard Disk Drive) 54. The computer 50 further includes a super IO (Input Output) 55, a DVI (Digital Visual Interface) 56, and an ODD (Optical Disk Drive) 57.

The memory 51 includes a RAM (Random Access Memory) that stores, for example, a program, or an intermediate result of execution of the program, and. The CPU 52 is a central processing unit that reads out and executes a program from the memory 51. The CPU 52 includes a chip set having a memory controller.

The LAN interface 53 is an interface for connecting the computer 50 to another computer via a LAN. The HDD 54 is a disk device that stores programs and data, and the super IO 55 is an interface for connecting input devices such as a mouse and a keyboard. The DVI 56 is an interface for connecting a liquid crystal display device, and the ODD 57 is a device for reading and writing a DVD and a CD-R.

The LAN interface 53 is connected to the CPU 52 by PCI Express (PCIe), and the HDD 54 and the ODD 57 are connected to the CPU 52 by SATA (Serial Advanced Technology Attachment). The super IO 55 is connected to the CPU 52 by LPC (Low Pin Count).

Then, the resource management program executed in the computer 50 is stored in a CD-R which is an example of a recording medium readable by the computer 50, read out from the CD-R by the ODD 57, and installed in the computer 50. Alternatively, the resource management program is stored in, for example, a database of another computer system connected via the LAN interface 53, read out from the databases, and installed in the computer 50. Then, the installed data processing program is stored in the HDD 54, read into the memory 51, and executed by the CPU 52.

Further, while the case of using the SPECwpc benchmark score has been described in the embodiments, the resource management apparatus 1 may use other benchmark scores.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A resource management apparatus, comprising:
   a memory; and
   a processor coupled to the memory and the processor configured to:
   receive a usage of a target virtual machine provided to a user and a request benchmark score requested by the user;
   determine first resources to be used for constructing the target virtual machine based on the received usage and request benchmark score; and
   construct a first virtual machine using the first resources.

2. The resource management apparatus according to claim 1, wherein
   the processor is further configured to:
   cause the first virtual machine to execute a benchmark program to measure a first benchmark score;
   acquire the first benchmark score;
   determine whether the first virtual machine matches a user's request based on the first benchmark score and the request benchmark score;
   change the first resources to second resources when it is determined that the first virtual machine does not match the user's request;
   construct a second virtual machine using the second resources;
   cause the second virtual machine to execute the benchmark program to measure a second benchmark score; and
   acquire the second benchmark score.

3. The resource management apparatus according to claim 1, wherein
   the processor is further configured to:
   calculate a resource benchmark score requested for each resource based on the received usage and request benchmark score;
   predict resources to be used for construction of the target virtual machine based on the calculated resource benchmark score;
   determine whether it is possible to construct the target virtual machine using the predicted resources based on resource information including a use state of resources; and
   change one or more resources among the predicted resources when it is determined that it is impossible to construct the target virtual machine.

4. The resource management apparatus according to claim 3, wherein
   the processor is further configured to:
   change the one or more resources by changing performance of the one or more resources.

5. The resource management apparatus according to claim 4, wherein
   the processor is further configured to:
   lower, when one resource is changed by raising performance of the one resource, performance of another resource.

6. A non-transitory computer-readable recording medium having stored therein a program that causes a computer to execute a process, the process comprising:
   receiving a usage of a target virtual machine provided to a user and a request benchmark score requested by the user;
   determining first resources to be used for constructing the target virtual machine based on the received usage and request benchmark score; and
   constructing a first virtual machine using the first resources.

7. The non-transitory computer-readable recording medium according to claim 6, the process further comprising:
   causing the first virtual machine to execute a benchmark program to measure a first benchmark score;
   acquiring the first benchmark score;
   determining whether the first virtual machine matches a user's request based on the first benchmark score and the request benchmark score;
   changing the first resources to second resources when it is determined that the first virtual machine does not match the user's request;
   constructing a second virtual machine using the second resources;
   causing the second virtual machine to execute the benchmark program to measure a second benchmark score; and
   acquiring the second benchmark score.

8. A resource management method, comprising:
   receiving, by a computer, a usage of a target virtual machine provided to a user and a request benchmark score requested by the user;
   determining first resources to be used for constructing the target virtual machine based on the received usage and request benchmark score; and
   constructing a first virtual machine using the first resources.

9. The resource management method according to claim 8, further comprising:
   causing the first virtual machine to execute a benchmark program to measure a first benchmark score;
   acquiring the first benchmark score;
   determining whether the first virtual machine matches a user's request based on the first benchmark score and the request benchmark score;
   changing the first resources to second resources when it is determined that the first virtual machine does not match the user's request;
   constructing a second virtual machine using the second resources;
   causing the second virtual machine to execute the benchmark program to measure a second benchmark score; and
   acquiring the second benchmark score.

* * * * *